United States Patent
Hope et al.

(10) Patent No.: US 10,549,183 B2
(45) Date of Patent: *Feb. 4, 2020

(54) ELECTRONIC CONTROLLER WITH A HAND RETAINER, OUTER SHELL, AND FINGER SENSING

(71) Applicant: VALVE CORPORATION, Bellevue, WA (US)

(72) Inventors: Eric James Hope, Duvall, WA (US); Scott Nietfeld, Bellevue, WA (US); Carl Conlee, Bellevue, WA (US); Scott Richard Britt, Kirkland, WA (US); Jeffrey Walter Mucha, Sammamish, WA (US); Jeffrey George Leinbaugh, Kirkland, WA (US); Jeremy Slocum, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,425

(22) Filed: Dec. 7, 2017

(65) Prior Publication Data

US 2018/0104576 A1  Apr. 19, 2018

Related U.S. Application Data

(63) Continuation-in-part of application No. 15/679,521, filed on Aug. 17, 2017, now Pat. No. 10,391,400, and
(Continued)

(51) Int. Cl.
*A63F 13/24* (2014.01)
*A63F 13/214* (2014.01)

(52) U.S. Cl.
CPC ............ *A63F 13/24* (2014.09); *A63F 13/214* (2014.09)

(58) Field of Classification Search
CPC ........ G06F 3/014; G06F 1/169; G06F 3/0213; G06F 2212/3035; A63F 13/428;
(Continued)

(56) References Cited

U.S. PATENT DOCUMENTS 5,184,120 A   2/1993  Schultz
5,302,936 A   4/1994  Yaniger
(Continued)

OTHER PUBLICATIONS

Brown et al, "5 improvements we're excited to see from Valve's 'Knuckles' controllers", retrieved on Jan. 20, 2019 at <<https://www.vrheads.com/5-Improvements-were-exclted-see-valves-knuckles-controllers>>, VR Heads, Jul. 11, 2017.
(Continued)

*Primary Examiner* — Jasson H Yoo
(74) *Attorney, Agent, or Firm* — Lee & Hayes, P.C.

(57) ABSTRACT

A controller for an electronic system includes a controller body having a head and a handle, and a tracking member that is fixed to the controller body. The head includes at least one thumb-operated control, and the handle has a tubular housing that is partially wrapped by an outer shell. The controller includes a hand retainer configured to physically bias the user's palm against the outer shell. A first plurality of tracking transducers is disposed in the tracking member, the first plurality of tracking sensors being coupled with the electronic system via electromagnetic radiation. An array of proximity sensors is spatially distributed on the outer shell, the array of proximity sensors being responsive to a proximity of the user's fingers to the outer shell.

28 Claims, 8 Drawing Sheets

Related U.S. Application Data a continuation-in-part of application No. 29/580,635, filed on Oct. 11, 2016, now Pat. No. Des. 806,173.

(60) Provisional application No. 62/520,958, filed on Jun. 16, 2017.

(58) Field of Classification Search
CPC .. A63F 13/24; A63F 2009/2407; A63F 13/20; A63F 13/40; A63F 13/42; A63F 13/92; A63F 13/214
See application file for complete search history.

(56) References Cited

U.S. PATENT DOCUMENTS

| | | | |
|---|---|---|---|
| 7,932,892 B2 | 4/2011 | Chen et al. | |
| 8,062,126 B2 | 11/2011 | Marks et al. | |
| 8,636,199 B1* | 1/2014 | Slayden | G10H 1/0091 235/375 |
| 8,816,964 B2 | 8/2014 | Edwards | |
| 9,690,408 B1 | 6/2017 | Krah | |
| 9,696,223 B2 | 7/2017 | Lisseman et al. | |
| 10,353,506 B2 | 7/2019 | Vosgueritchian et al. | |
| 10,386,224 B2 | 8/2019 | Shim et al. | |
| 2002/0010020 A1* | 1/2002 | Johnson | A63F 13/02 463/37 |
| 2002/0175894 A1* | 11/2002 | Grillo | G06F 3/014 345/156 |
| 2004/0012557 A1* | 1/2004 | Daniel | A63F 13/06 345/156 |
| 2005/0172734 A1 | 8/2005 | Alsio et al. | |
| 2005/0179644 A1 | 8/2005 | Alsio et al. | |
| 2005/0259069 A1 | 11/2005 | Baker et al. | |
| 2006/0146018 A1 | 7/2006 | Arneson et al. | |
| 2006/0293864 A1 | 12/2006 | Soss | |
| 2007/0078316 A1 | 4/2007 | Hoarau et al. | |
| 2007/0146349 A1 | 6/2007 | Errico et al. | |
| 2007/0249422 A1* | 10/2007 | Podoloff | G06F 3/0219 463/43 |
| 2008/0136778 A1* | 6/2008 | Hursh | G06F 3/014 345/164 |
| 2008/0146336 A1 | 6/2008 | Feldman et al. | |
| 2008/0261693 A1 | 10/2008 | Zalewski | |
| 2008/0311990 A1 | 12/2008 | Chiu et al. | |
| 2009/0005166 A1 | 1/2009 | Sato | |
| 2009/0256817 A1 | 10/2009 | Perlin et al. | |
| 2009/0305786 A1 | 12/2009 | Chang | |
| 2010/0245239 A1* | 9/2010 | Sternberg | A63F 13/06 345/156 |
| 2011/0059796 A1 | 3/2011 | Kondo et al. | |
| 2011/0080339 A1 | 4/2011 | Sun et al. | |
| 2011/0084932 A1 | 4/2011 | Simmons et al. | |
| 2011/0159959 A1 | 6/2011 | Mallinson et al. | |
| 2012/0088580 A1 | 4/2012 | Takeda et al. | |
| 2012/0143091 A1 | 6/2012 | Annett et al. | |
| 2012/0214594 A1 | 8/2012 | Kirovski et al. | |
| 2013/0027341 A1* | 1/2013 | Mastandrea | G06F 3/014 345/173 |
| 2013/0063342 A1 | 3/2013 | Chen et al. | |
| 2013/0096849 A1 | 4/2013 | Campbell et al. | |
| 2014/0098018 A1* | 4/2014 | Kim | G06F 3/014 345/156 |
| 2014/0240267 A1 | 8/2014 | Luo | |
| 2015/0091858 A1 | 4/2015 | Rosenberg et al. | |
| 2015/0120777 A1 | 4/2015 | Ramos | |
| 2015/0352437 A1 | 12/2015 | Koseki et al. | |
| 2016/0026253 A1 | 1/2016 | Bradski et al. | |
| 2016/0030835 A1 | 2/2016 | Argiro | |
| 2016/0085355 A1 | 3/2016 | Pirogov et al. | |
| 2016/0124500 A1* | 5/2016 | Lee | G06F 3/011 345/156 |
| 2016/0246369 A1 | 8/2016 | Osman | |
| 2016/0259404 A1 | 9/2016 | Woods | |
| 2016/0306932 A1* | 10/2016 | Fateh | G06F 19/3456 |
| 2016/0317267 A1 | 11/2016 | Meerbeek et al. | |
| 2016/0342218 A1* | 11/2016 | Burba | G06F 3/017 |
| 2016/0356658 A1 | 12/2016 | Hou et al. | |
| 2016/0357261 A1* | 12/2016 | Bristol | A63F 13/24 |
| 2017/0031503 A1 | 2/2017 | Rosenberg et al. | |
| 2017/0139481 A1* | 5/2017 | Long | G06F 3/014 |
| 2017/0205903 A1 | 7/2017 | Miller et al. | |
| 2017/0351345 A1 | 12/2017 | Nirjon et al. | |
| 2018/0025531 A1 | 1/2018 | Terahata | |
| 2018/0067545 A1 | 3/2018 | Provancher et al. | |
| 2018/0099219 A1 | 4/2018 | Hope et al. | |
| 2018/0161670 A1* | 6/2018 | Boev | A63F 13/24 |
| 2019/0076716 A1 | 3/2019 | Chiou et al. | |
| 2019/0138107 A1 | 5/2019 | Nietfeld et al. | |
| 2019/0232160 A1 | 8/2019 | Hope et al. | |

OTHER PUBLICATIONS

Non Final Office Action dated Jan. 8, 2019 for U.S. Appl. No. 15/679,521 "Electronic Controller With Hand Retainer and Finger Motion Sensing" Mucha, 11 pages.

PCT Search Report and Written Opinion dated Feb. 6, 2019 for PCT Application No. PCT/US2018/064116, 8 pages.

PCT Search Report and Written Opinion dated Feb. 8, 2019 for PCT Application No. PCT/US2018/064120, 11 pages.

Non Final Office Action dated Jul. 15, 2019 for U.S. Appl. No. 16/010,385 "Electronic Controller with Finger Motion Sensing" Nietfeld, 11 pages.

Freescale Semiconductor, Inc. "Touch Sensors", 2009, <<https://www.freescale.com/touch>>, 2 pages.

Invitation to Pay Fees dated Aug. 6, 2019 for Application PCT/US2019/32982 "Sensor Fusion Algorithms for a Handheld Controller That Includes a Force Sensing Resistor (FSR)", 2 pages.

Non Final Office Action dated Jul. 23, 2019 for U.S. Appl. No. 15/984,245 "Sensor Fusion Algorithms for a Handheld Controller That Includes a Force Sensing Resistor (FSR)" Dalton, 18 pages.

Non Final Office Action dated Sep. 18, 2019 for U.S. Appl. No. 16/289,420 "Sensor Fusion Algorithms for a Handheld Controller That Includes a Force Sensing Resistor (FSR)" Leinbaugh, 13 pages.

Non Final Office Action dated Sep. 19, 2019 for U.S. Appl. No. 15/984,231 "Force Sensing Resistor (FSR) With Polyimide Substrate, Systems, and Methods Thereof" Campbell, 35 pages.

PCT Search Report and Written Opinion dated Jul. 24, 2019 for PCT Application No. PCT/US19/32928, 4 pages.

PCT Search Report and Written Opinion dated Aug. 15, 2019 for PCT Application No. PCT/US2019/032968, 12 pages.

PCT Search Report and Written Opinion dated Sep. 10, 2019 for PCT Application No. PCT/US2019/037794, 10 pages.

PCT Search Report and Written Opinion dated Sep. 17, 2019 for PCT Application No. PCT/US2019/037802, 7 pages.

* cited by examiner

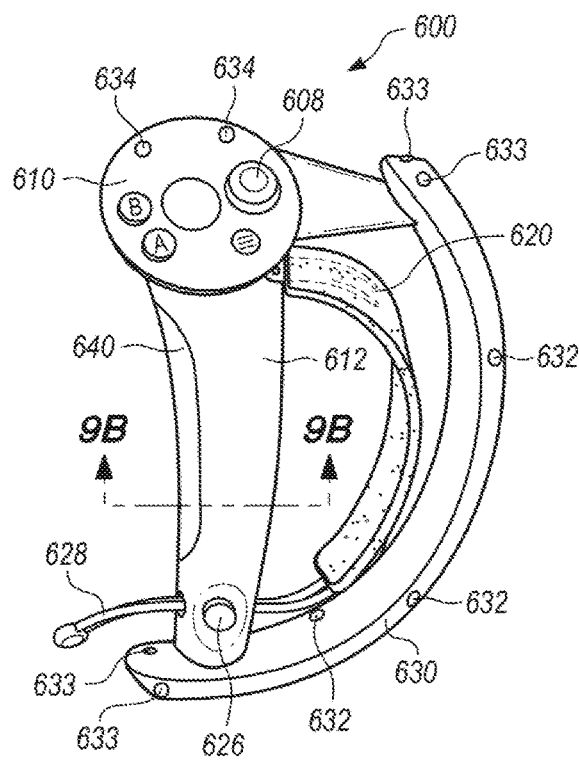
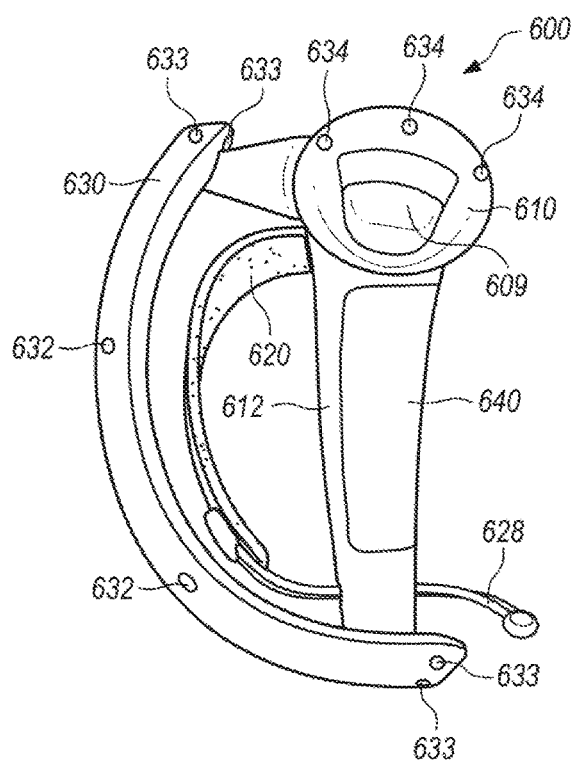
FIG. 6A
FIG. 6B
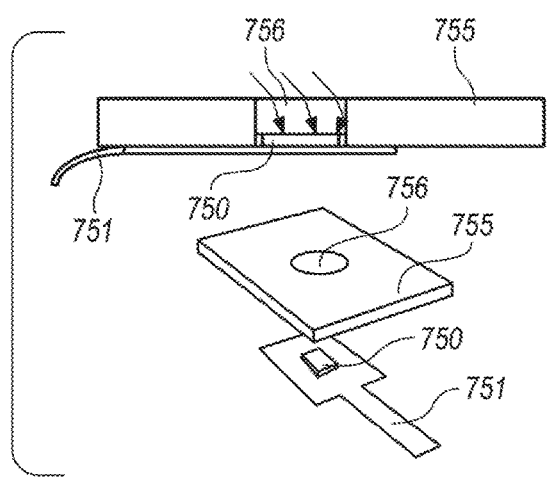
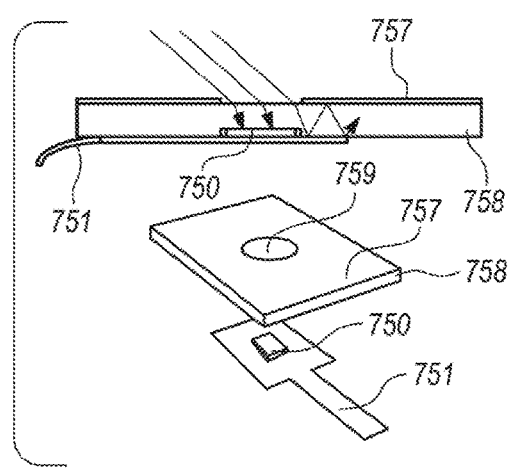
FIG. 7A
FIG. 7B

US 10,549,183 B2

ELECTRONIC CONTROLLER WITH A HAND RETAINER, OUTER SHELL, AND FINGER SENSING

CROSS-REFERENCE TO RELATED APPLICATION

This application claims priority under 35 U.S.C. § 120 as a continuation-in-part to pending U.S. patent application Ser. No. 15/679,521 filed on 17 Aug. 2017, entitled "Electronic controller with hand retainer and finger motion sensing," which itself claims priority as a continuation-in-part to U.S. patent application Ser. No. 29/580,635 filed 11 Oct. 2016, and claims priority to U.S. Provisional Patent Application 62/520,958 filed 16 Jun. 2017.

BACKGROUND OF THE DISCLOSURE

The video game industry has become large and important, and has spawned many innovations in both software and related hardware. Various hand-held video game controllers have been designed, manufactured, and sold, for a variety of game applications. Some of those innovations have applicability outside of the video game industry, such as for controllers of industrial machines, defense systems, robotics, etc. Virtual reality (VR) systems are an application of great contemporary interest and rapid technical advancement, both within and outside of the video game industry. The controllers for VR systems have to perform several different functions, and meet strict (and sometimes competing) design constraints, often while optimizing certain desired characteristics like ease of use, etc. Hence, there is a need in the art for an improved controller design that may improve VR systems and/or better facilitate user operation.

BRIEF DESCRIPTION OF THE DRAWINGS

FIG. 6A depicts a front view of right-hand controller according to another example embodiment of the present invention.

FIG. 6B depicts a back view of the right-hand controller of FIG. 6A.

FIG. 7A depicts a window for an infrared light sensor, according to an embodiment of the present invention.

FIG. 7B depicts a window for an infrared light sensor, according to another embodiment of the present invention.

DETAILED DESCRIPTION OF EXAMPLE EMBODIMENTS

Figure 1:
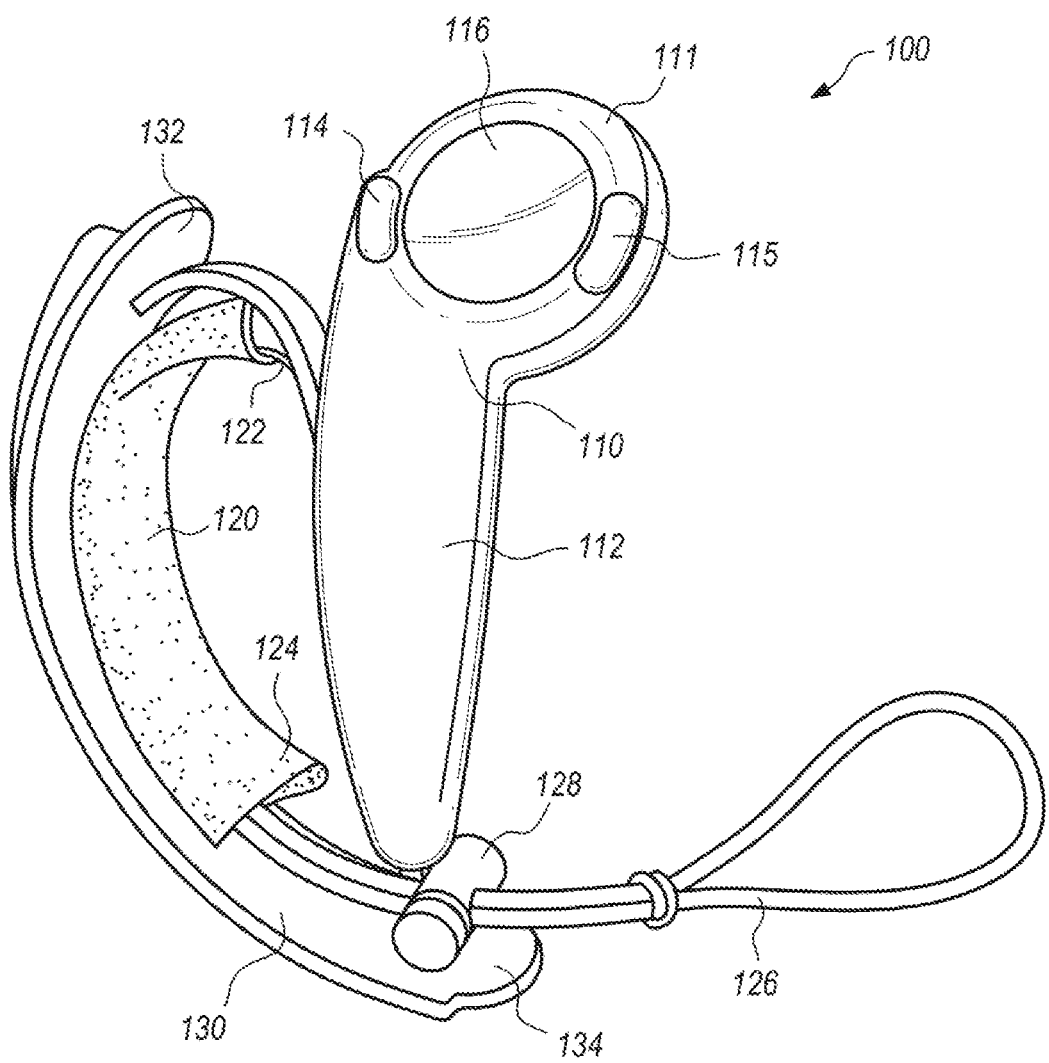
FIG. 1 depicts a controller according to an example embodiment of the present invention, with a hand retainer in an open position.

FIGS. 1-4 depict a controller 100 for an electronic system according to an example embodiment of the present invention. The controller 100 may be utilized by an electronic system such as a VR video gaming system, a robot, weapon, or medical device. The controller 100 may include a controller body 110 having a handle 112, and a hand retainer 120 to retain the controller 100 in the hand of a user (e.g. the user's left hand). The handle 112 comprises a tubular housing that may optionally be substantially cylindrical. In this context, a substantially cylindrical shape need not have constant diameter, or a perfectly circular cross-section.

In the embodiment of FIGS. 1-4, the controller body 110 may include a head (between the handle 112 and a distal end 111), which may optionally include one or more thumb-operated controls 114, 115, 116. For example, a tilting button, or any other button, knob, wheel, joystick, or trackball may be considered as a thumb-operated control if it may be conveniently manipulated by a user's thumb during normal operation while the controller 100 is held in the hand of the user.

The controller 100 preferably includes a tracking member 130 that is fixed to the controller body 110, and optionally includes two noses 132, 134, each protruding from a corresponding one of two opposing distal ends of the tracking member 130. In the embodiment of FIGS. 1-4, the tracking member 130 is preferably but not necessarily a tracking arc having an arcuate shape. The tracking member 130 includes a plurality of tracking transducers disposed therein, preferably with at least one tracking transducer disposed in each protruding nose 132, 134. Additional tracking transducers may be disposed also in the controller body 110, with preferably at least one distal tracking transducer disposed adjacent the distal end 111.

The foregoing tracking transducers may be tracking sensors that are responsive to electromagnetic radiation (e.g. infrared light) emitted by the electronic system, or they may alternatively be tracking beacons that emit electromagnetic radiation (e.g. infrared light) that is received by the electronic system. For example, the electronic system may be a VR gaming system that widely broadcasts, i.e. paints, pulsed infrared light towards the controller 100, with the plurality of tracking transducers of the tracking member 130 being infrared light sensors that may receive or be shadowed from the broadcast pulsed infrared light. The tracking transducers in each nose 132, 134 (e.g. 3 sensors in each nose) preferably overhang the user's hand on each distal end of the tracking member 130, and so are better exposed (around the user's hand) to receive electromagnetic radiation emitted by the electronic system or to transmit the electromagnetic radiation to the electronic system, at more angles without an unacceptable amount of shadowing.

Preferably, the tracking member 130 and the controller body 110 are made of a substantially rigid material such as hard plastic, and are firmly fixed together so that they do not appreciably translate or rotate relative to each other. In this way, the tracking of the translation and rotation of the constellation of tracking transducers in space, is preferably not complicated by motion of the tracking transducers relative to each other. For example, as shown in FIGS. 1-4, the tracking member 130 may be fixed to the controller body 110 by being joined to the controller body 110 at two locations. The hand retainer 120 may be attached to the controller 100 (either the controller body 110 or the tracking member 130) adjacent those two locations, to bias the user's palm against the outside surface of the handle 112 between the two locations.

In certain embodiments, the tracking member 130 and the controller body 110 may comprise an integral monolithic component having material continuity, rather than being assembled together. For example, the tracking member 130 and the controller body 110 may be molded together by a single injection-molding process step, resulting in one integral hard plastic component that comprises both the tracking member 130 and the controller body 110. Alternatively, the tracking member 130 and the controller body 110 may be initially fabricated separately, and then later assembled together. Either way, the tracking member 130 may be considered as fixed to the controller body 110.

The hand retainer 120 is shown in the open position in FIG. 1. The hand retainer 120 may optionally be biased in the open position by a curved resilient member 122, to facilitate the insertion of the user's left hand between the hand retainer 120 and the controller body 110 when the user is grasping for the controller with vision blocked by VR goggles. For example, the curved resilient member 122 may optionally be a flexible metal strip that elastically bends, or may comprise an alternative plastic material such as nylon that may bend substantially elastically. The curved resilient member 122 may optionally be partially or completely internal to or covered by a cushion or fabric material 124 (e.g. a neoprene sheath), for the user's comfort. Alternatively, the cushion or fabric material 124 may be disposed on (e.g. adhered to) only the side of the curved resilient member 122 that faces the user's hand.

The hand retainer 120 optionally may be adjustable in length, for example by including a draw cord 126 that is cinched by a spring-biased chock 128. The draw cord 126 may optionally have an excess length that may be used as a lanyard. The sheath 124 optionally may be attached to the draw cord. In certain embodiments, the curved resilient member 122 may be preloaded by the tension of the cinched draw cord 126. In such embodiments, the tension that the curved resilient member 122 imparts to the hand retainer 120 (to bias it in the open position) causes the hand retainer to automatically open when the draw cord 126 is un-cinched. This disclosure also contemplates alternative conventional ways to adjust the length of a hand retainer 120, such as a cleat, an elastic band (that temporarily stretches when the hand is inserted, so that it applies elastic tension to press against the back of the hand), a hook & loop strap attachment that allows length adjustment, etc.

Figure 2:
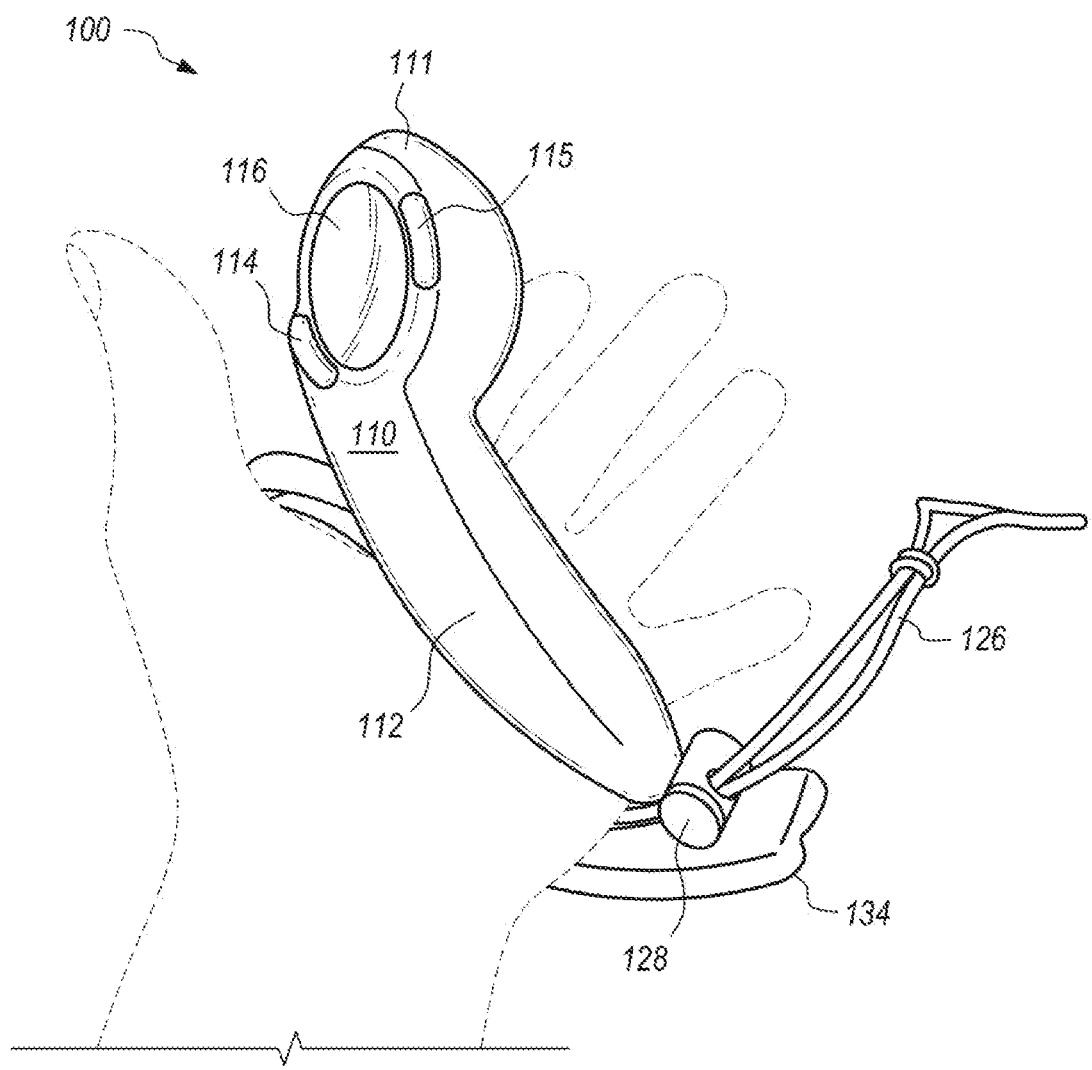
FIG. 2 depicts the controller of FIG. 1 in a user's open hand, palm up.
Figure 3:
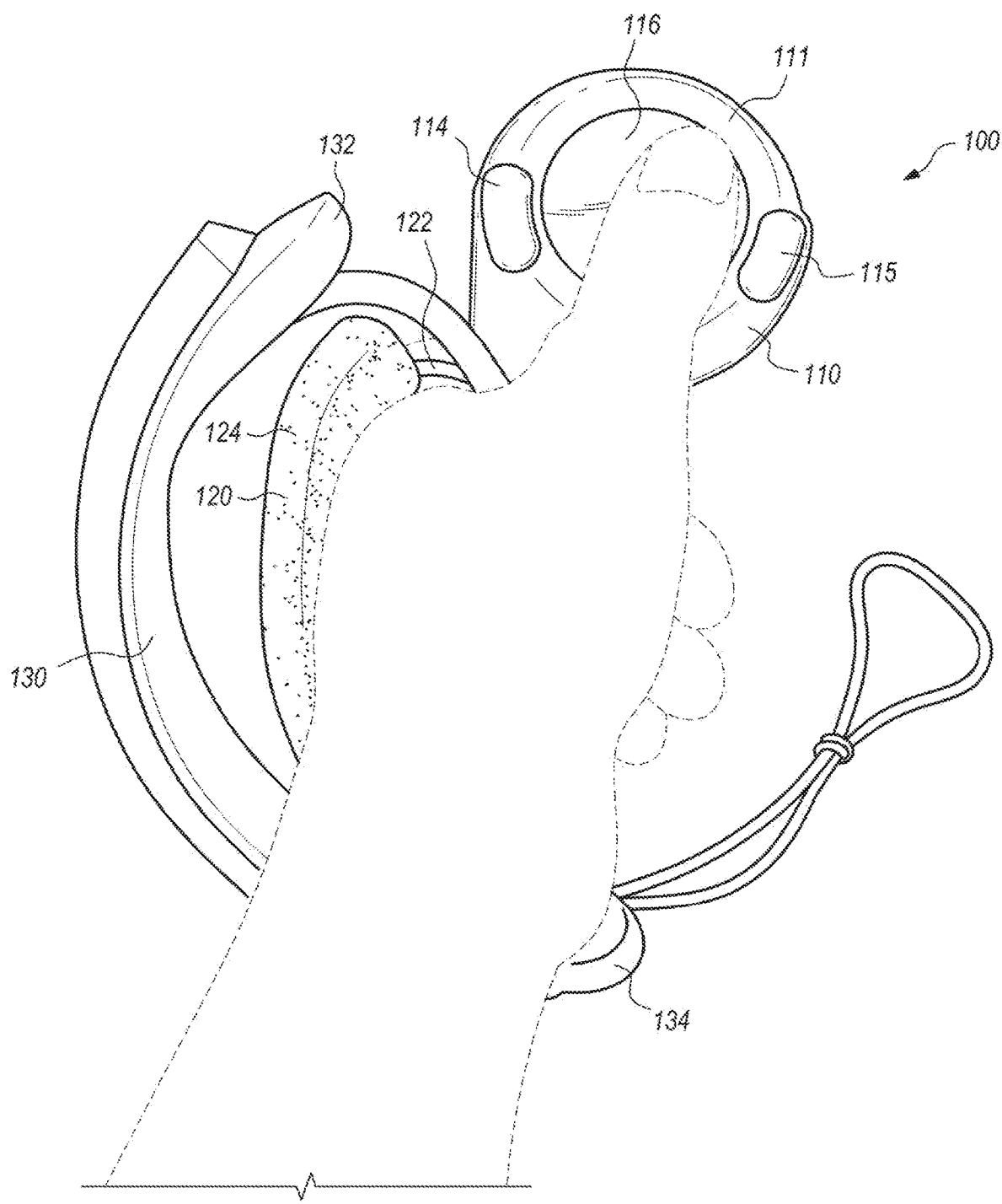
FIG. 3 depicts the controller of FIG. 1 in a user's closed hand.
Figure 4:
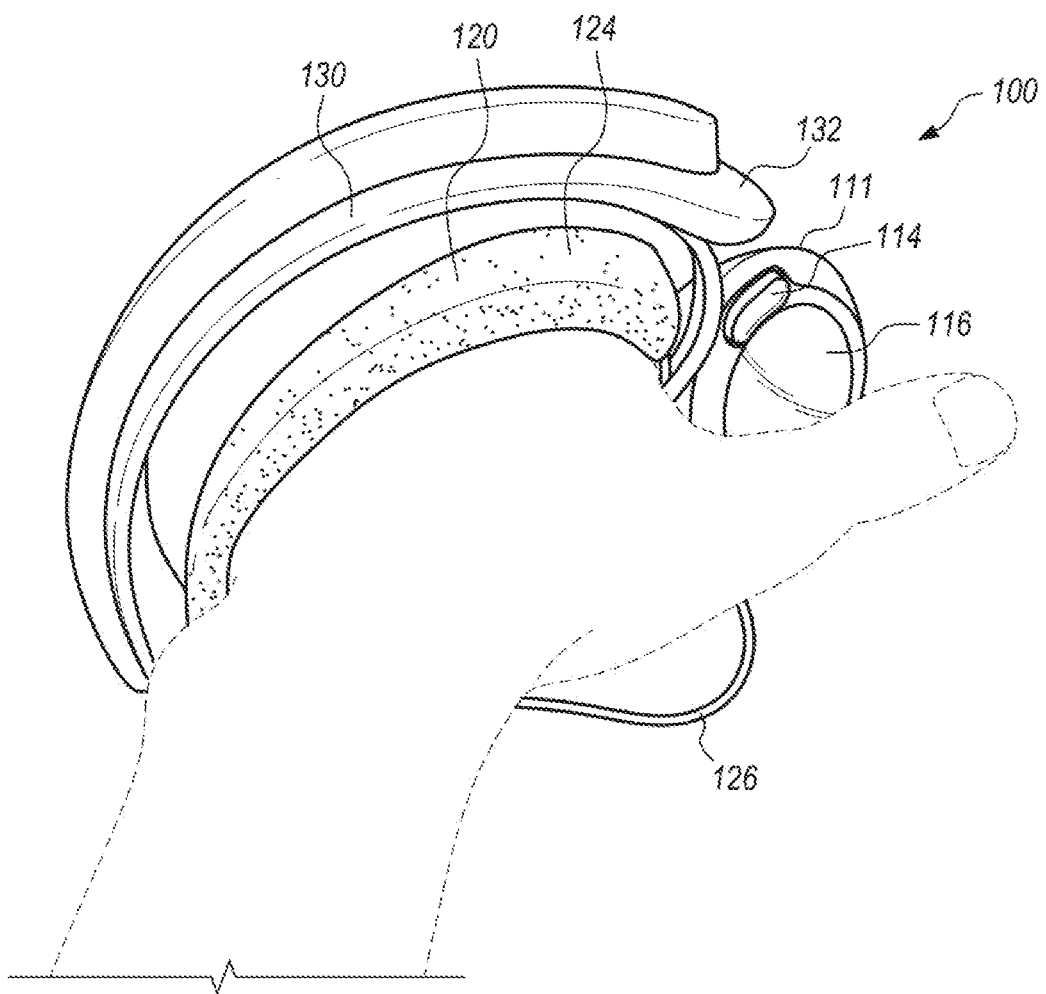
FIG. 4 depicts the controller of FIG. 1 in a user's hand, palm down.

The hand retainer 120 may be disposed between the handle 112 and the tracking member 130, and be configured to contact the back of the user's hand. FIG. 2 shows the controller 100 during operation with the user's left hand inserted therein but not grasping the controller body 110. In FIG. 2, the hand retainer 120 is closed and tightened over the hand, to physically bias the user's palm against the outside surface of the handle 112. In that way, the hand retainer 120, when closed, may retain the controller 100 to the hand even when the hand is not grasping the controller body 110. FIGS. 3 and 4 depict the controller 100 during operation when the hand retainer 120 is closed, and the hand is grasping the controller body 110 and the thumb is operating one or more of the thumb-operated controls (e.g. track pad 116).

The handle 112 of the controller body 110 preferably includes an array of proximity sensors that are spatially distributed partially or completely around its outer surface. The proximity sensors of the array are not necessarily of equal size and do not necessarily have equal spacing between them, although the array may comprise a grid. The array of proximity sensors is preferably responsive to the proximity of the user's fingers to the outside surface of the handle 112. For example, the array of proximity sensors may be a plurality of capacitive sensors embedded under the outer surface of the handle 112, with that outer surface comprising an electrically insulative material. The capacitance between such an array of capacitive sensors and a portion of the user's hand is inversely related to the distance there between. The capacitance may be sensed by connecting an RC oscillator circuit to an element of the capacitance sensor array, and noting that the time constant of the circuit (and therefore the period and frequency of oscillation) will vary with the capacitance. In this way, the circuit may detect a release of a user's fingers from the outer surface of the handle 112.

When the hand retainer 120 (e.g. a hand-retention strap) is closed tightly, it may serve not only to prevent the controller 100 from falling out of hand, but also to keep fingers from excessively translating relative to the proximity sensor array of the handle 112, to more reliably sense finger motion. The electronic system may include an algorithm embodying anatomically-possible motions of fingers, to better use the sensing from the proximity sensor array to render the opening of a controlled character's hand, finger pointing, or other motions of fingers relative to controller or relative to each other. In this way, the user's movement of the controller 100 and/or fingers may help control a VR gaming system, defense system, medical system, industrial robot or machine, or another device. In VR system applications (e.g. for gaming, training, etc.), the system may render a throwing motion based on the movement of the tracking transducers, and may render the release of a thrown object based on the sensed release of the user's fingers from the outer surface of the handle of the controller.

Hence, the function of the hand retainer 120 (to allow the user to "let go" of the controller 100 without the controller 100 actually separating from the hand or being thrown or dropped to the floor) may enable additional functionality of the controlled electronic system. For example, if the release and restoration of the user's grasp of the handle 112 of the controller body 110 is sensed, then such release or grasping may be incorporated into the game to display (e.g. in VR) throwing or grasping objects. The hand retainer 120 may allow such a function to be accomplished repeatedly and safely. For example, the location of the hand retainer 120 in the embodiment of FIGS. 1-4 may help the tracking member 130 to protect back of user's hand from impacts in real world, for example when the user moves in response to a prompt sensed in the VR environment (e.g. while practically blinded by VR goggles).

In certain embodiments, the controller 100 may include a rechargeable battery disposed within the controller body 110, and the hand retainer 120 (e.g. hand retention strap) may include an electrically-conductive charging wire that is electrically coupled to the rechargeable battery. The controller 100 preferably also includes a radio frequency (RF) transmitter for communication with the rest of the electronic system. Such RF transmitter may be powered by the rechargeable battery and may be responsive to the thumb-operated controls 114, 115, 116, the proximity sensors in the handle 112 of the controller body 110, and/or tracking sensors in the tracking member 130.

Figure 5:
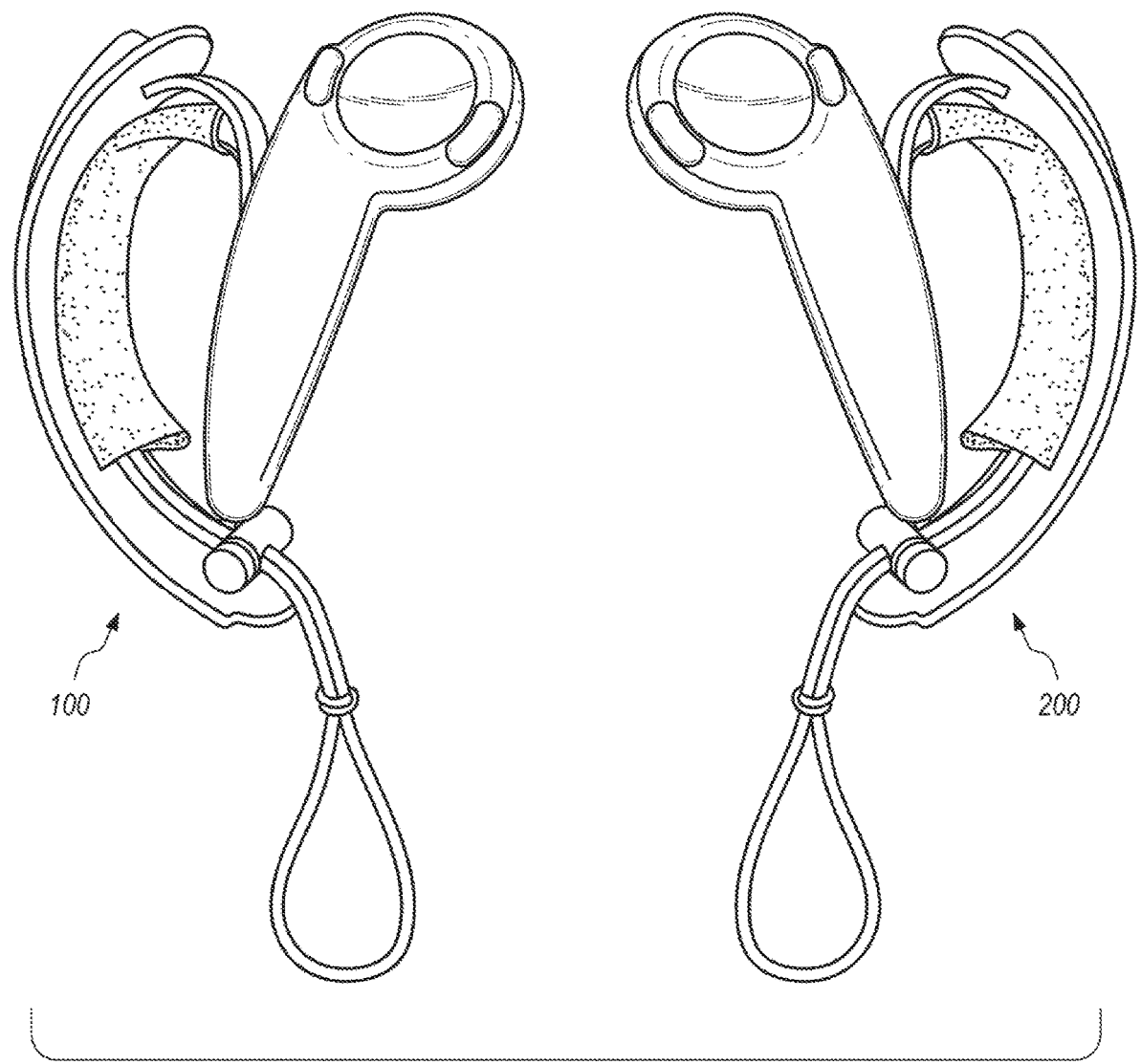
FIG. 5 depicts a pair of controllers according to an example embodiment of the present invention, with hand retainers in an open position.

As shown in FIG. 5, in certain embodiments the controller 100 may be the left controller in a pair of controllers that includes a similar right controller 200. In certain embodiments, the controllers 100 and 200 may (together) track the motion and grip of both of a user's hands, simultaneously, for example to enhance a VR experience.

FIG. 6A depicts a front view of right-hand controller 600 according to another example embodiment of the present invention. FIG. 6B depicts a back view of the right-hand controller 600. The controller 600 has a controller body comprising a head 610 and a handle 612. In the embodiment of FIGS. 6A-6B, the head 610 includes at least one thumb-operated control A, B, 608, and may also include a control configured to be operated by the index finger (e.g. trigger 609). The handle 612 comprises a tubular housing that is partially wrapped by an outer shell 640.

In the embodiment of FIGS. 6A-6B, a tracking member 630 is fixed to the controller body at the head 610 and at an end of the handle 612. A hand retainer 620 is configured to physically bias the user's palm against the outer shell 640 between the head 610 and the end of the handle 612. The hand retainer 620 is preferably disposed between the handle 612 and the tracking member 630, and may comprise a hand retention strap that is adjustable in length and configured to contact the back of the user's hand. In the embodiment of FIGS. 6A-6B, the hand retainer 620 optionally includes a draw cord 628, and optionally can be adjusted in length by a cord lock 626 (adjacent a distal end of the handle 612) that selectively prevents sliding motion by the draw cord 628 at the location of the cord lock 626.

In the embodiment of FIGS. 6A-6B, tracking transducers 632, 633 are disposed on the tracking member 630, with tracking transducers 633 being disposed on protruding noses at opposing distal ends of the tracking member 630. Additional tracking transducers 634 are optionally disposed on a distal region of the head 610. The tracking transducers 632, 633, and 634 may be tracking sensors that are responsive to electromagnetic radiation (e.g. infrared light) emitted by the electronic system (e.g. virtual reality gaming system), or may be tracking beacons that emit electromagnetic radiation (e.g. infrared light) that is received by the electronic system. For example, the electronic system may be a VR gaming system that widely broadcasts, i.e. paints, pulsed infrared light towards the controller 600, with the tracking transducers 632, 633, and 634 being infrared light sensors that may receive the broadcast pulsed infrared light. The response of such tracking sensors may be communicated back to the electronic system, and the system may interpret such response to effectively track the location and orientation of the controller 600.

One or more of the tracking transducers 632, 633, 634 optionally may be structured as shown in the embodiment of FIG. 7A, or alternatively shown in the embodiment of FIG. 7B, or alternatively in a conventional way that is not shown. The lower portion of FIG. 7A depicts an exploded perspective view of an infrared light sensor 750 that is electrically connected to a flex circuit 751, shown beneath a rectangular portion of an overlying windowed housing wall 755 that comprises an infrared-opaque plastic. The windowed housing wall 755 includes a window 756. The window 756 preferably comprises an infrared-transmissive polycarbonate plastic, and may include an underside recession to accommodate the thickness of the infrared light sensor 750.

According to the embodiment of FIG. 7A, the windowed housing wall (e.g. the outer structure of the tracking member 630, or the head 610 of FIG. 6A) may be fabricated from a so-called "double shot" injection molding process, so that the majority of the housing wall is fabricated from infrared-opaque plastic, but with infrared-transmissive plastic being disposed in the window 756 above the infrared light sensor 750.

The upper portion of FIG. 7A depicts a cross-sectional view of the infrared light sensor 750, flex circuit 751, and the windowed housing wall 755 as assembled. Infrared light, shown in FIG. 7A as three downward arrows incident upon the window 756 from above, passes through the window 756 to be received by the underlying infrared light sensor 750. Since the housing wall 755 comprises infrared-opaque plastic, the infrared light that strikes it will not pass through, and a portion may be reflected back into the window to be received by the infrared light sensor 750. In this way, the window 756 permits infrared light to affect the infrared light sensor 750, despite the majority of the housing wall 755 comprising infrared-opaque plastic, so that the infrared light sensor 750 receives infrared light only from a preferred angular range.

Alternatively, one or more of the tracking transducers 632, 633, 634 optionally may be structured as shown in the embodiment of FIG. 7B. The lower portion of FIG. 7B depicts an exploded perspective view of the infrared light sensor 750 as electrically connected to the flex circuit 751, shown beneath a rectangular portion of an overlying housing wall 758 that comprises an IR-transmissive plastic. The housing wall 758 is coated with an infrared-opaque film 757 that is patterned to include a window 759 (where the infrared-opaque film 757 is absent).

The upper portion of FIG. 7B depicts a cross-sectional view of the infrared light sensor 750, flex circuit 751, the housing wall 758, and the IR-opaque film 757, as assembled. Infrared light, shown in FIG. 7B as three downward arrows incident upon the housing wall 758 from above, passes through the window 759 in the infrared-opaque film 757 to pass through the housing wall 758 there to be received by the underlying infrared light sensor 750. Since the housing wall 758 comprises infrared-transmissive plastic, the infrared light that strikes it may pass into it and be lost, and perhaps unintentionally and undesirably even reach a nearby sensor via internal reflections. In this way, the window 759 in the infrared-opaque film 757 permits infrared light to primarily affect the infrared light sensor 750.

Figure 8:
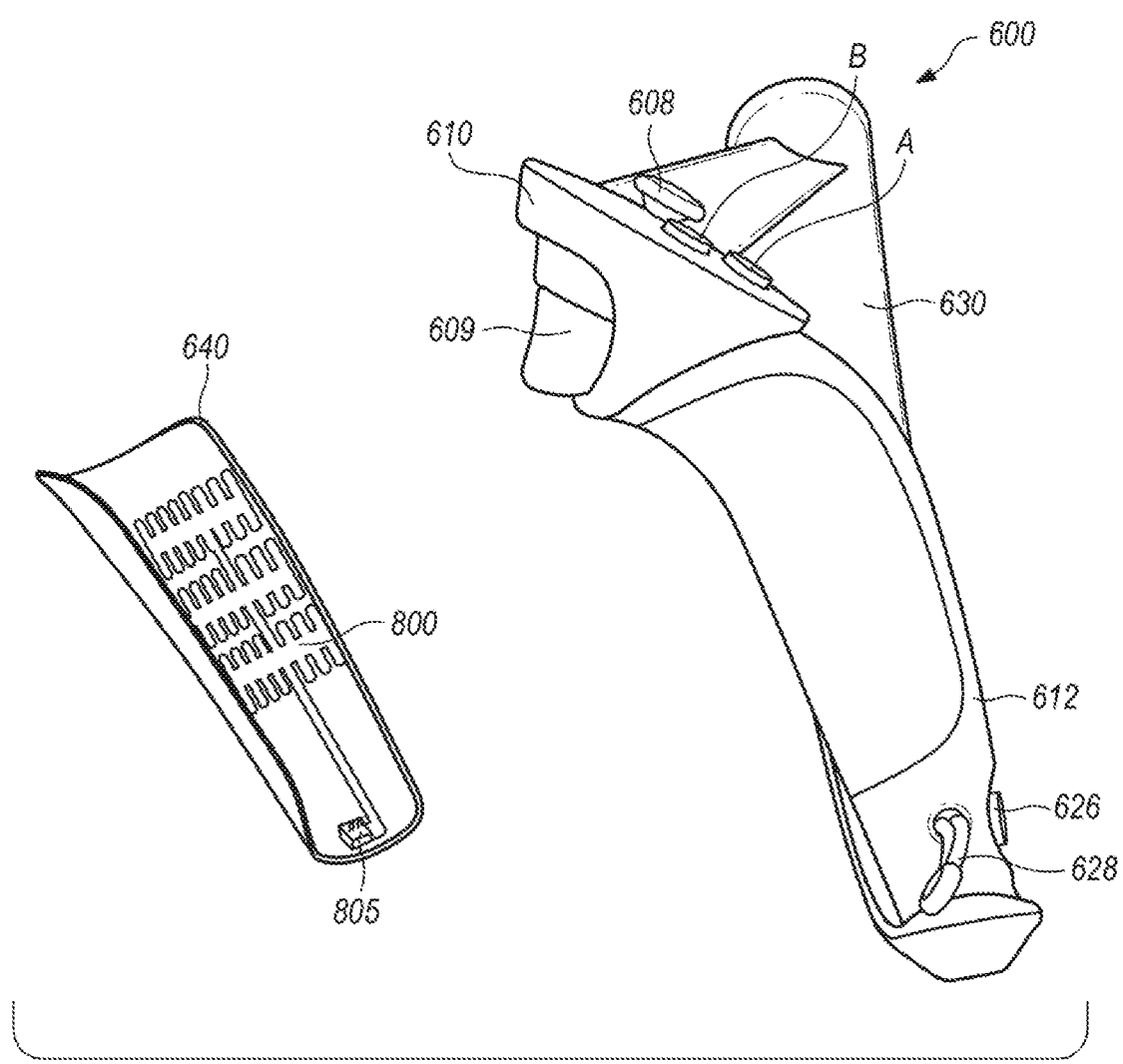
FIG. 8 shows a side view of the right-hand controller of FIG. 6A, with an outer shell that partially wraps the tubular housing of the controller's handle being exploded away to reveal instrumentation on its inner surface.

FIG. 8 shows a side view of the right-hand controller 600, with the outer shell 640, which partially wraps the tubular housing of the handle 612 being exploded away to reveal instrumentation on its inner surface. In the embodiment of FIG. 8, the instrumentation may comprise an array of proximity sensors 800 that are spatially distributed on the inner surface of the outer shell 640, the array of proximity sensors 800 being responsive to a proximity of the user's fingers to the outer shell 640. The proximity sensors 800 of the array are not necessarily of equal size, nor are they necessarily spaced regularly or equally from each other. In certain embodiments, the array of proximity sensors 800 preferably may be a plurality of capacitive sensors that may be connected to a flex circuit that is bonded to the inner surface of the outer shell 640. In the embodiment of FIG. 8, the outer shell 640 includes a first electrical connector portion 805, which may be connected to a mating second electrical connector portion of the handle 612 (as shown in more detail in FIGS. 9A-9B).

Figure 9A:
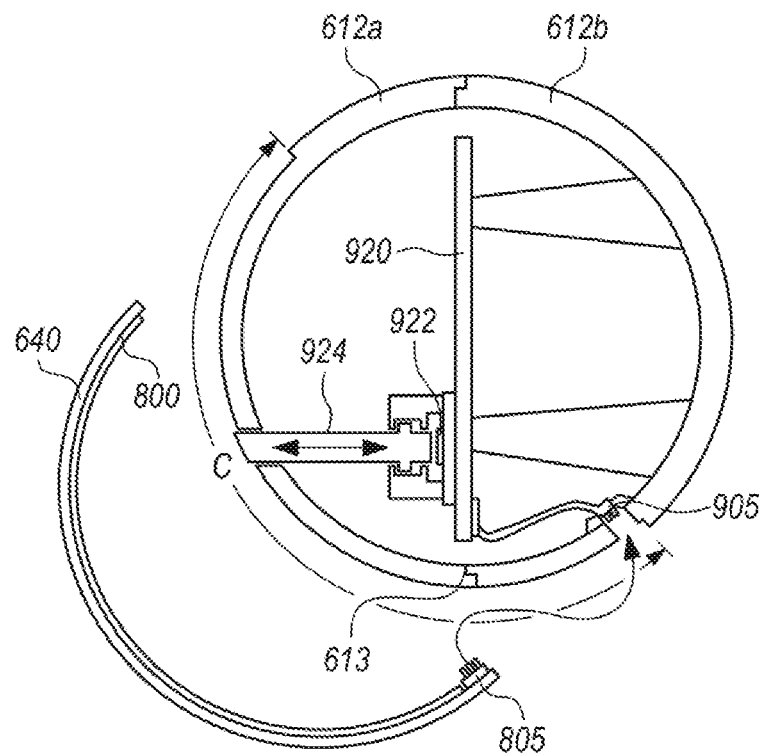
FIG. 9A depicts a cross section of the right-hand controller of FIG. 6A, with an outer shell that partially wraps the tubular housing of the controller's handle being exploded away.
Figure 9B:
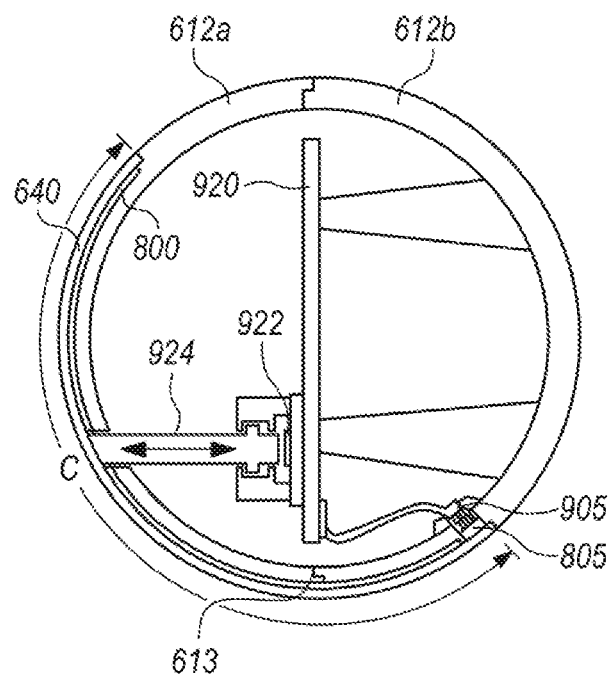
FIG. 9B depicts the cross section of FIG. 9A, except with the outer shell installed in its normal operational position.

FIGS. 9A-B depicts cross sections of the right-hand controller 600 of FIG. 6A, showing that the controller's handle optionally may comprise a tubular housing 612a, 612b, that is split longitudinally by a seam 613 where the tubular housing portions 612a and 612b adjoin. In FIG. 9A, the outer shell 640 is shown exploded away from the rest of the handle. FIG. 9B depicts the cross section of FIG. 9A, except with the outer shell 640 installed in its normal operational position.

In the embodiment of FIGS. 9A-9B, the first electrical connector portion 805 of the outer shell 640 is shown to be mating and connectable to the second electrical connector portion 905 of the controller handle.

In the embodiment of FIGS. 9A-9B, the outer shell 640 partially wraps the tubular housing 612*a*, 612*b* in such a way that it preferably overlaps the longitudinal seam 613, so that the longitudinal seam 613 may be positioned to optimize the process of manufacture rather than to accommodate the desired circumferential location of the proximity sensor array 800. In certain embodiments, the outer shell 640 overlaps a circumferential portion C of the tubular housing 612*a*, 612*b* of the handle, and the circumferential portion C angularly spans at least 100 degrees but not more than 170 degrees of the full circumference of the tubular housing 612*a*, 612*b* of the handle. Such a circumferential overlap may, in certain embodiments, enable the proximity sensor array 800 to sense the proximity of a desired portion of the user's fingers or palm, for example the region of the hand that best indicates grasping.

The tubular housing 612*a*, 612*b* of the handle need not have a circular cross-section, and that the word "circumference" is used herein whether or not the tubular housing 612*a*, 612*b* of the handle has a circular cross-section. Herein, the term "circumference" implies the complete perimeter about the tubular housing 612*a*, 612*b* of the handle, which may be circular if the tubular housing 612*a*, 612*b* is a right circular hollow cylinder, but which may be a closed shape other than a circle if the tubular housing is shaped as a non-circular cylinder or hollow prism.

In the embodiment of FIGS. 9A-9B, a printed circuit board (PCB) 920 may be mounted within the tubular housing 612*a*, 612*b* of the handle, with the second electrical connector portion 905 being electrically coupled to the PCB 920. The PCB 920 optionally includes a force sensing resistor (FSR) 922, and the controller may further comprise a plunger 924 that conveys a compressive force applied via the outer shell 640 towards the outside of the tubular housing 612*a*, 612*b* of the handle inward to the FSR 922. In certain embodiments, the FSR 922, in conjunction with the proximity sensor array 800, may facilitate sensing of both the onset of grasping by the user, and the relative strength of such grasping by the user, which may be facilitate certain gameplay features.

In certain embodiments, the outer shell 640 has a shell thickness (measured radially in FIGS. 9A-9B) that is less than one-third of a housing wall thickness of the tubular housing portions 612*a* or 612*b* of the handle. In those embodiments, such a thickness inequality may improve the sensitivity of the proximity sensor array 800 relative to an alternative embodiment where the proximity sensor array 800 is disposed on or in the tubular housing 612*a*, 612*b* of the handle.

The invention is described with reference to specific exemplary embodiments herein, but those skilled in the art will recognize that the invention is not limited to those. It is contemplated that various features and aspects of the invention may be used individually or jointly and possibly in a different environment or application. For example, features shown with regards to a right-hand controller may be implemented also in a left-hand controller, and vice versa. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A controller for an electronic system, for operation by a user having a hand with a thumb, fingers, and a palm, the controller comprising:
   a controller body having a head and a handle, the head including at least one thumb-operated control, and the handle having a tubular housing that is partially wrapped by an outer shell;
   a tracking member that is fixed to the controller body;
   a hand retainer comprising a hand-retention strap configured to physically bias the palm against the handle, wherein the hand-retention strap includes a curved resilient member to bias the hand retainer in an open position;
   a first plurality of tracking transducers disposed in the tracking member, the first plurality of tracking transducers being coupled with the electronic system via electromagnetic radiation; and
   an array of proximity sensors that are spatially distributed in a plurality of rows of proximity sensors on an inner surface of the outer shell, the array of proximity sensors being responsive to a proximity of the fingers to the outer shell.

2. The controller of claim 1, wherein the first plurality of tracking transducers comprises a plurality of tracking sensors that are responsive to electromagnetic radiation that is emitted by the electronic system.

3. The controller of claim 2, wherein the plurality of tracking sensors are infrared light sensors that are responsive to pulsed infrared light emitted by the electronic system.

4. The controller of claim 3, wherein each of the infrared light sensors is covered by infrared-transmissive polycarbonate plastic.

5. The controller of claim 1, wherein the first plurality of tracking transducers comprises a plurality of tracking beacons that emit electromagnetic radiation for reception by the electronic system.

6. The controller of claim 1, wherein the tracking member is a tracking arc having an arcuate shape.

7. The controller of claim 1, wherein the tracking member is fixed to the controller body by being joined to the controller body at two locations, and the hand-retention strap is adjustable in length to bias the palm against the handle between the two locations.

8. The controller of claim 1, wherein the hand-retention strap is disposed between the handle and the tracking member.

9. The controller of claim 1, wherein the hand-retention strap is adjustable in length and is configured to contact a back of the hand.

10. The controller of claim 1, further comprising a second plurality of tracking transducers disposed in the controller body, the second plurality of tracking transducers including at least one distal tracking transducer that is disposed in the head.

11. The controller of claim 1, wherein the tracking member includes two noses, each protruding from a corresponding one of two opposing distal ends of the tracking member, each nose including at least one of the first plurality of tracking transducers.

12. The controller of claim 1, wherein the array of proximity sensors is a plurality of capacitive sensors that are attached to the inner surface of the outer shell.

13. The controller of claim 12, wherein the plurality of capacitive sensors are disposed on a flex circuit, the flex circuit being attached to the inner surface of the outer shell.

14. The controller of claim 1, wherein the outer shell angularly spans at least 100 degrees but not more than 170 degrees of a full circumference of the tubular housing of the handle.

15. The controller of claim 1, wherein the outer shell includes a first electrical connector portion, and the tubular housing of the handle includes a second electrical connector portion, and the first and second electrical connector portions are mating and connectable.

16. The controller of claim 15, further comprising a printed circuit board (PCB) mounted within the tubular housing of the handle, the second electrical connector portion being electrically coupled to the PCB.

17. The controller of claim 16, wherein the PCB includes a force sensing resistor (FSR), and the controller further comprises a plunger that conveys a compressive force applied to an outside of the tubular housing of the handle inward to the FSR.

18. The controller of claim 1, wherein the tubular housing of the handle is split longitudinally by a seam, and the outer shell spans the seam.

19. The controller of claim 1, wherein the outer shell has a shell thickness, and the tubular housing has a housing wall thickness, and the shell thickness is less than one-third of the housing wall thickness.

20. A controller for an electronic system, for operation by a user having a hand with a thumb, fingers, and a palm, the controller comprising:
a controller body having a head and a handle, the head including at least one thumb-operated control;
a tracking member that is fixed to the controller body;
a hand retainer comprising a hand-retention strap configured to physically bias the palm against an outer surface of the handle, wherein the hand-retention strap includes a curved resilient member to bias the hand retainer in an open position;
a first plurality of tracking transducers disposed in the tracking member, the first plurality of tracking transducers being coupled with the electronic system via electromagnetic radiation; and
an array of proximity sensors that are embedded under the outer surface of the handle and spatially distributed in a plurality of rows of proximity sensors, the array of proximity sensors being responsive to a proximity of the fingers to the outer surface of the handle.

21. The controller of claim 20, further comprising a force sensing resistor (FSR) mounted within the handle to detect a compressive force applied to the handle.

22. The controller of claim 20, wherein the hand retention strap is adjustable in length.

23. The controller of claim 20, wherein the proximity sensors of the array of proximity sensors are at least one of:
not of equal size;
not regularly spaced from each other; or
not equally spaced from each other.

24. The controller of claim 1, wherein the proximity sensors of the array of proximity sensors are at least one of:
not of equal size;
not regularly spaced from each other; or
not equally spaced from each other.

25. A controller for an electronic system, for operation by a user having a hand with a thumb and fingers, the controller comprising:
a controller body having a head and a handle, the head including at least one thumb-operated control;
a tracking member that is fixed to the controller body;
a hand retainer comprising a hand retention strap that includes a curved resilient member to bias the hand retainer in an open position;
a first plurality of tracking transducers disposed in the tracking member, the first plurality of tracking transducers being coupled with the electronic system via electromagnetic radiation;
an array of proximity sensors that are spatially distributed on the handle, the array of proximity sensors being responsive to a proximity of the fingers to the outer surface of the handle; and
a force sensing resistor (FSR) mounted within the handle to detect a compressive force applied to the handle.

26. The controller of claim 25, wherein the array of proximity sensors includes a plurality of rows of proximity sensors, individual rows of the plurality of rows running circumferentially about the handle.

27. The controller of claim 25, wherein the hand retention strap is adjustable in length to transition the hand retainer from the open position to a closed position and to physically bias the hand against the outer surface of the handle when the hand retainer is in the closed position.

28. The controller of claim 25, wherein the proximity sensors of the array of proximity sensors are at least one of:
not of equal size;
not regularly spaced from each other; or
not equally spaced from each other.

\* \* \* \* \*